(12) United States Patent
Mukkara et al.

(10) Patent No.: US 9,270,459 B2
(45) Date of Patent: Feb. 23, 2016

(54) TECHNIQUES FOR ACHIEVING TENANT DATA CONFIDENTIALITY FROM CLOUD SERVICE PROVIDER ADMINISTRATORS

(75) Inventors: Umasankar Mukkara, Bangalore (IN); Felix Xavier, Bangalore (IN); Shyamsundar Ranganathan, Bangalore (IN)

(73) Assignee: CloudByte, Inc., Cupertino, CA (US)

( * ) Notice: Subject to any disclaimer, the term of this patent is extended or adjusted under 35 U.S.C. 154(b) by 224 days.

(21) Appl. No.: 13/611,170

(22) Filed: Sep. 12, 2012

(65) Prior Publication Data

US 2012/0328105 A1    Dec. 27, 2012

(30) Foreign Application Priority Data

Sep. 20, 2011    (IN) .......................... 3233/CHE/2011

(51) Int. Cl.
*H04L 9/00*    (2006.01)
*H04L 9/08*    (2006.01)

(52) U.S. Cl.
CPC .................. *H04L 9/0897* (2013.01)

(58) Field of Classification Search
CPC ...................................................... H04L 9/0897
See application file for complete search history.

(56) References Cited

U.S. PATENT DOCUMENTS

| 7,802,111 | B1 * | 9/2010 | Tahan | 713/193 |
|---|---|---|---|---|
| 2008/0083036 | A1 * | 4/2008 | Ozzie et al. | 726/27 |
| 2012/0110328 | A1 * | 5/2012 | Pate et al. | 713/165 |
| 2012/0166818 | A1 * | 6/2012 | Orsini et al. | 713/193 |

* cited by examiner

*Primary Examiner* — Michael Chao
*Assistant Examiner* — Devin Almeida
(74) *Attorney, Agent, or Firm* — Schwegman Lundberg & Woessner, P.A.

(57) ABSTRACT

Techniques for achieving tenant data confidentiality in a cloud environment are presented. A daemon process within a Tenant Storage Machine (TSM) manages a key store for a particular tenant of a cloud storage environment having multiple other tenants. Just TSM storage processes are given access to the key store. Data is decrypted for the particular tenant when access is needed and data is encrypted using encryption keys of the key store when written in the cloud storage environment.

19 Claims, 5 Drawing Sheets

TECHNIQUES FOR ACHIEVING TENANT DATA CONFIDENTIALITY FROM CLOUD SERVICE PROVIDER ADMINISTRATORS

RELATED APPLICATIONS

The present application is co-pending with and claims foreign priority to Indian Provisional Patent Application No. 3233/CHE/2011 entitled: "A Method for Protecting Tenant Data from a Service Provider in a Cloud Storage Environment," filed with the Indian Patent Office on Sep. 20, 2011, the disclosure of which is incorporated by reference herein in its entirety.

BACKGROUND

Cloud computing is rapidly changing the Internet into a collection of clouds, which provide a variety of computing resources, storage resources, and, in the future, a variety of resources that are currently unimagined.

Specifically, cloud computing is a technology infrastructure that facilitates: supplementing, consuming, and delivering Information Technology (IT) services. The cloud environment provides elastic provisioning of dynamically scalable virtual services.

A tenant is considered as a subscriber of some amount of storage in the cloud or an application who owns part of the shared storage environment. Multi-tenancy is an architecture where a single instance of software runs on a server, which is serving multiple tenants. In a multi-tenant environment, all tenants and their users consume the service from a same technology platform, sharing all components in the technology stack including the data model, servers, and database layers. Further, in a multi-tenant architecture, the data and configuration is virtually partitioned and each tenant works with a customized virtual application instance.

In a Cloud Service Provider's environment, multiple customers, tenants, applications share a common storage infrastructure. The shared storage infrastructure includes storage controllers and raw storage disks. It is often a common scenario that some enterprise customers or users have a stringent requirement that their data is stored in an encrypted manner so that no one else can read their data.

Specifically today, whenever, data needs to be encrypted for confidentiality, several encryption algorithms are used with a key being stored at the tenant (or client) or at the server (storage controller).

So, tenant or client can manage the storage keys or the storage controller can manage the storage keys.

The problem with the key being stored at tenant (or client) is that in the case of key being lost by the tenant (or client), the encrypted data on the server becomes useless. This results in a complete loss of data.

The problem with the key being stored on the server (or the storage controller) is that, the administrator of the storage controller who knows the root password can use the key to decrypt the data. So, true confidentiality is never achieved this way.

Moreover in both the cases, there is a problem with the confidentiality of the data of the tenant.

SUMMARY

Various embodiments of the invention provide techniques for achieving tenant data confidentiality. Specifically, and in one embodiment a method for tenant data confidentiality in a cloud environment is presented.

More particularly and in an embodiment, a tenant storage machine (TSM) is established in a cloud storage environment for an authenticated tenant. Next, a tenant key store is managed within the TSM for the tenant; the tenant key store including encryption keys for encrypting data of the authenticated tenant within the cloud storage environment. Finally, assurances are made so that just TSM storage processes are given access to the tenant key store.

DETAILED DESCRIPTION

A "resource" includes a user, service, system, device, directory, data store, groups of users, a file, a file system, combinations and/or collections of these things, etc. A "principal" is a specific type of resource, such as an automated service or user that acquires an identity. As used herein a "principal" may be used synonymously and interchangeably with the term "tenant."

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," "cloud environment," and the term "cloud" may be used interchangeably and synonymously herein.

Moreover, it is noted that a "cloud" refers to a logical and/or physical processing environment as discussed above.

The techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

It is within this context that embodiments of the invention are now discussed within the context of the FIGS. 1-4.

Figure 1A:
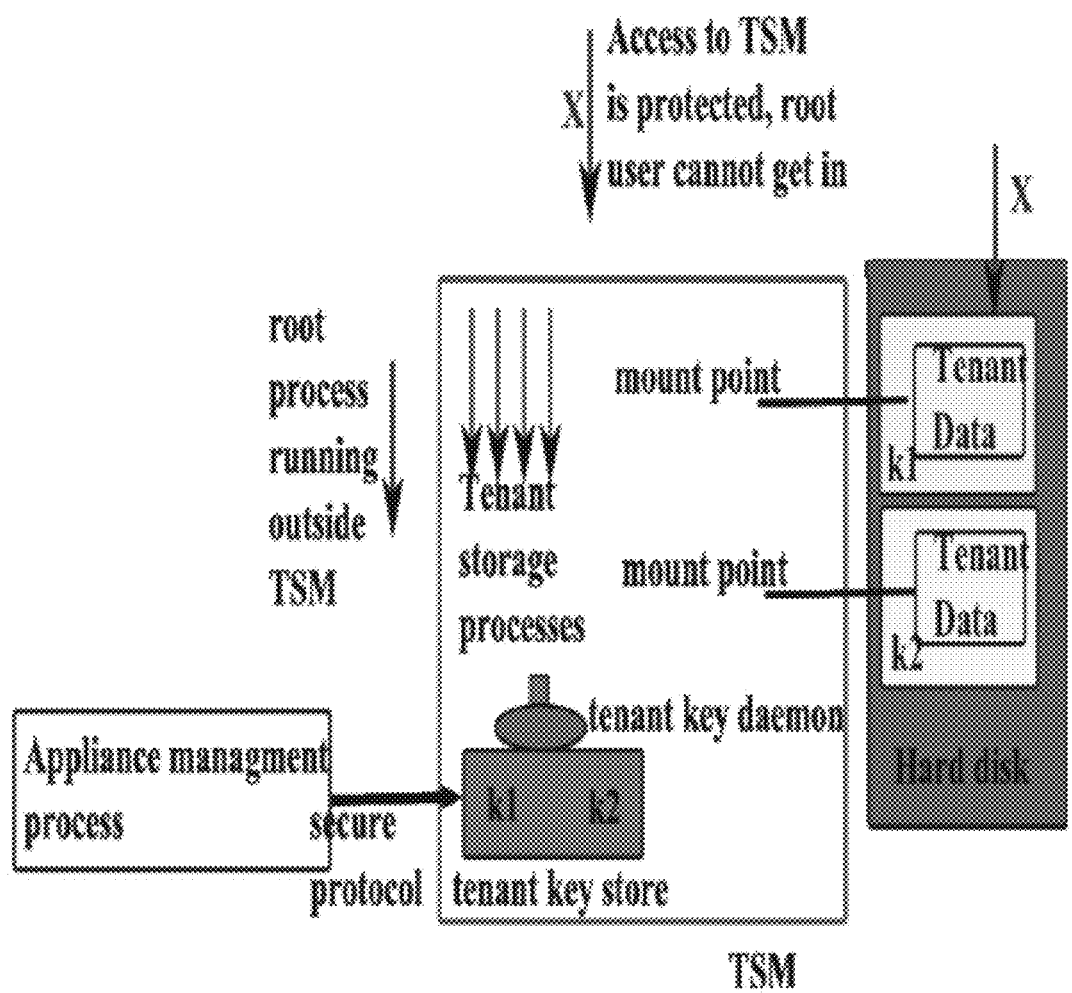
FIG. 1A is a diagram depicting an architecture for achieving tenant data confidentiality in a cloud storage environment, according to embodiments presented herein.

FIG. 1A is a diagram depicting an architecture for achieving tenant data confidentiality in a cloud storage environment, according to embodiments presented herein. It is noted that the architecture is presented as one example embodiment as other arrangements and elements are possible without departing from the teachings presented herein.

The techniques herein prescribe unique mechanisms for storing a tenant's data in such a way that only the tenant can read it and it is kept completely confidential even from the cloud service provider's administrator. This means that the tenant's data cannot be viewed by the cloud service provider.

The techniques presented solve the following specific problems:

1) When the tenant loses an encryption key, the tenant data in a shared storage environment becomes useless. So, there needs to be a tenant-transparent mechanism to encrypt the tenant data that results in tenant data confidentiality but the key loss should not result in data loss; and 2) When the encryption key is stored on the server, the server administrator who has the administrative privileges (or the root password) should not be able to decrypt the storage data;

As will be demonstrated more completely herein and below, the embodiments herein provide the following unique techniques/mechanisms to solve the above-referenced problems:

1) Providing a technique to manage the keys that only the tenant storage services are able to use to decrypt the corresponding tenant's data; and 2) Providing a technique to protect such keys from being accessed by the server administrator.

In other words, the approaches herein provide tenant data confidentiality in a multi-tenant storage environment where a particular tenant's data can be decrypted by only that tenant and the server administrator is be able to read any of the tenant data either through the storage controller or by directly accessing the hard disk.

As shown is the FIG. 1A, the architecture includes a key store per each tenant. The run time environment of a tenant is called a "Tenant Storage Machine" or TSM. The techniques herein prescribe one key store or key container per TSM. The key store includes the keys of the tenant's data. In the FIG. 1A, two blocks of tenant data is encrypted with two dynamically generated strong keys k1 and k2. These keys (k1 and k2) are stored in a key store. The key store is managed by a key daemon. The key daemon allows only the tenant storage processes running inside the TSM to access keys k1 and k2. In other words, it is impossible to get the keys k1 and k2 anywhere outside the TSM.

When a TSM is started, the tenant data is decrypted by the tenant storage processes and mount points are arranged. The decrypted tenant data can be accessed only by a process running inside the TSM.

Restrictions for an Administrator:

When the administrator intentionally wants to read the confidential tenant data, there are two ways he/she can try. The first is to run a process inside the TSM and read through the mount points. The second is to directly ready the data on the hard disk accessible to him.

In the first method, when the process owned by the root user outside the TSM tries to run a process inside the TSM, the TSM architecture disallows it. TSM exposes an interface though which few sets of standard messages can be sent to TSM from outside the TSM. The architecture allows only the application management process to follow a secure protocol and communicate through the above interface. So, it is impossible for the administrator to get access to the mount points inside the TSM.

In the second approach, the administrator has access to the hard disk, which has the encrypted data, but not the keys with which the data is encrypted. So, the encrypted data is worthless to the snooping administrator.

Figure 1B:
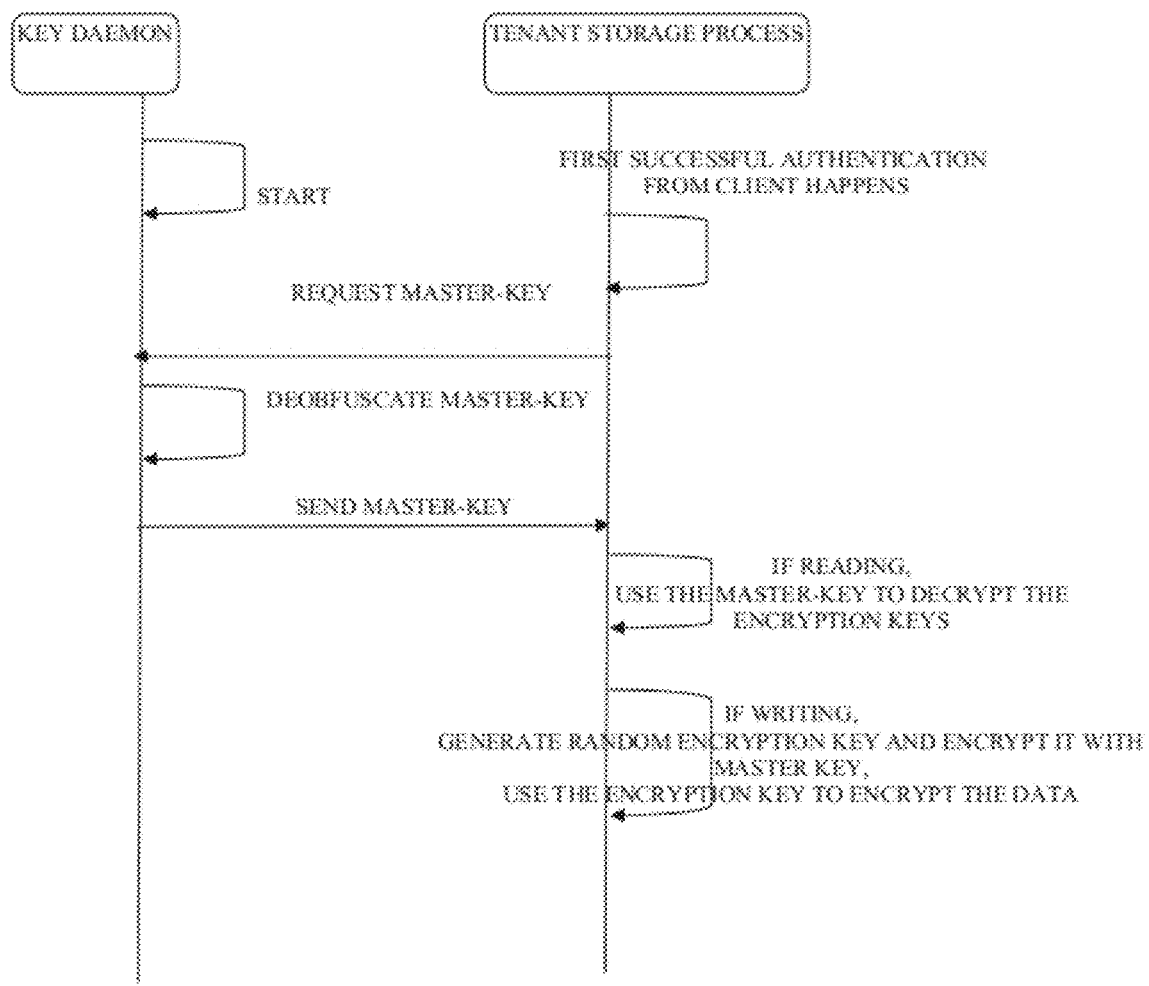
FIG. 1B is a sample sequence of operations and scenario for decrypting keys when achieving tenant data confidentiality, according to embodiments presented herein.

FIG. 1B is a sample sequence of operations and scenario for decrypting keys when achieving tenant data confidentiality, according to embodiments presented herein. Again, this is presented for purposes of illustration as other sequences can be used without departing from the beneficial teachings presented herein.

Process of Decryption of Keys (DEK) Inside a Key Daemon:

As shown below, the techniques prescribe a mechanism in which there is a master-key per tenant. This master-key (MK) is used to encrypt the data-encryption-key (DEK). Both MK and DEK are stored along with the data on the hard disk. The DEK is obfuscated with a static algorithm, which is kept in a secret manner. The DEK is continually changing whenever the data is being written to disk.

Per Block Encryption KEY

This technique uses a randomly generated DEK for each block of data. For example a text file of 1 MB is stored on a disk where the Block size is 128K. Which means 1 MB text file is stored in 8 blocks on the disk. This technique uses 8 randomly generated DEKs that are encrypted with MK.

If the cloud service provider needs to read this data by stealing the hard disk, he/she has to crack the 8 DEKs.

Data Encryption Key (DEK) and Master-Key Replication

As part of the data management, the cloud service provider may store multiple copies of data (for backup or disaster recovery purpose). Because the MK and DEK are stored alongside and with the data, the replication happens both to the encrypted data and corresponding keys.

As is demonstrated herein the techniques provided include:

1) a mechanism where the tenant is not required to know the keys with which the data is encrypted and yet, the tenant data is being kept confidential;

2) a mechanism where the tenant data is being kept confidential from other tenants and those others include the administrator having the root privileges;

3) a mechanism where a tenant data mount point is exposed to the tenant storage processes;

4) a mechanism for managing the keys on a per tenant basis;

5) a mechanism for storing the tenant keys in a key store managed by a key daemon and the key daemon exposes those keys only to the storage processes running inside the TSM;

6) a mechanism for using a randomly generated key for encrypting the tenant data encryption keys;

7) a mechanism for maintaining a per-block data encryption key, which makes the brute-force technique of cracking the key result in compromise of a block of data, not the entire data;

8) a mechanism of changing the data encryption key every time the data block is being written to the disk;

9) a mechanism of managing the data-encryption-key in such a way that it does not disturb the underlying data replication methods; as the DEK goes with replicated data, the replicated data can be decrypted anywhere as long as the de-obfuscated master-key is available.

Figure 2:
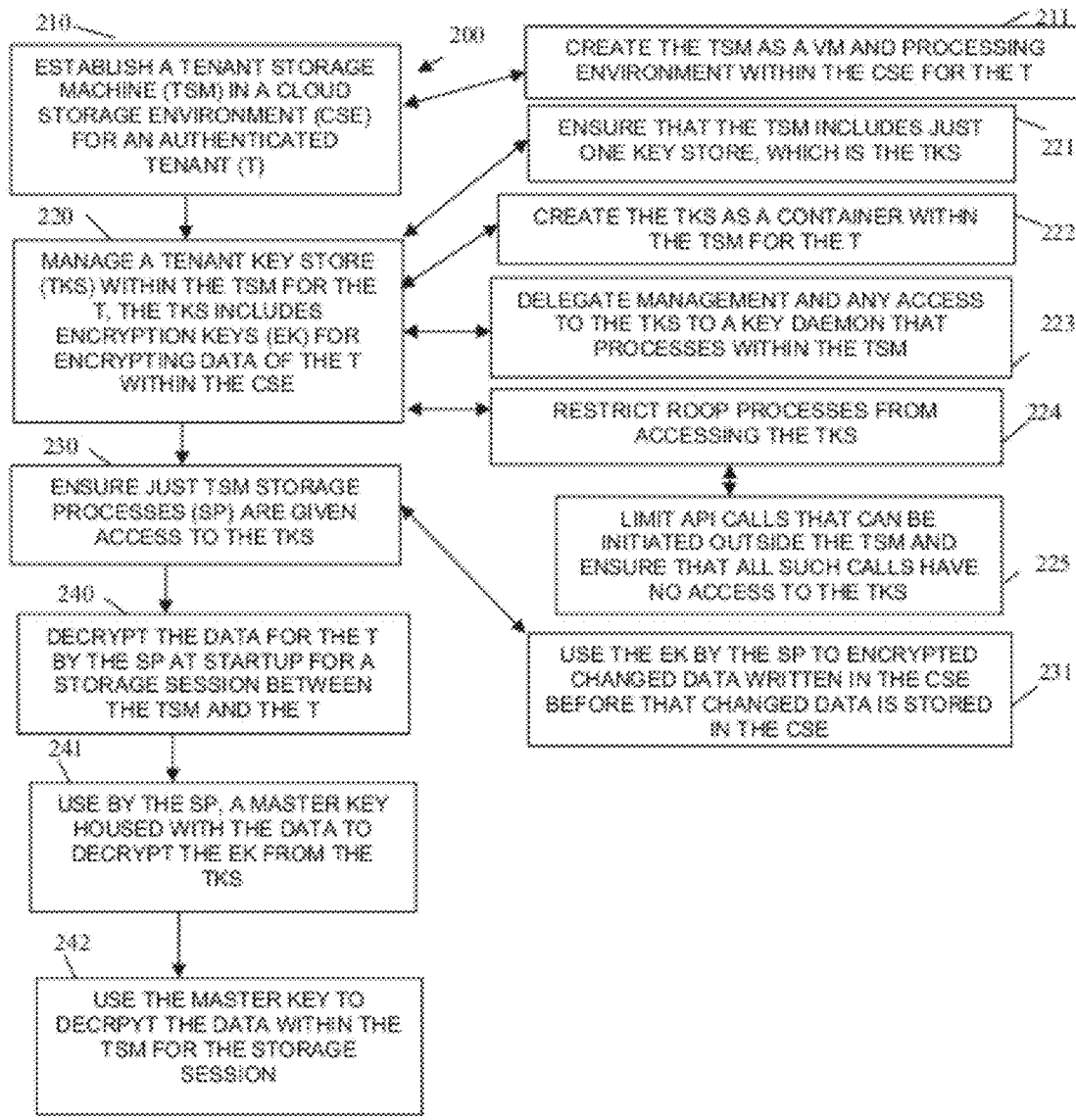
FIG. 2 is a diagram of a method for achieving tenant data confidentiality, according to embodiments presented herein.

FIG. 2 is a diagram of a method 200 for achieving tenant data confidentiality, according to embodiments presented herein. The method 300 (herein referred to as "key manager") is implemented, programmed, and resides within a non-transitory machine-readable storage medium that executes on one or more processors of a network. The network may be wired, wireless, or a combination of wired and wireless.

In an embodiment, the key manager is deployed and utilizes the architecture presented above with respect to the FIG. 1A and uses the sequence presented above with respect to the FIG. 1B.

At 210, the key manager establishes a tenant storage machine (TSM) in a cloud storage environment for an authenticated tenant. The cloud storage environment services multiple other storage tenants. Any authentication mechanism can ensure that the tenant is authenticated.

According to an embodiment, at 211, the key manager creates the TSM as a VM and processing environment within the cloud storage environment for the authenticated tenant to access the data of the authenticated tenant. So, each time a particular tenant authenticates to the cloud storage environment, a VM in a TSM for that tenant is created to manage the storage session between the tenant and the cloud storage environment, via the TSM.

At 220, the key manager manages a tenant key store within the TSM for the authenticated tenant. The tenant key store includes encryption keys for encrypting data of the authenticated tenant within the cloud storage environment. Other tenant specific keys may be housed here as well and managed on behalf of the tenant.

In an embodiment, at 221, the key manager ensures that the TSM includes just one key storage, which belongs to the tenant as the tenant key store. In other words, there is a one-to-one mapping of the a key store to a TSM and a one-to-one mapping between authenticated tenant and a TSM.

In another case, at 222, the key manager creates the tenant key store as a container within the TSM for the authenticated tenant. In other words, the tenant key store is a logical data structure created and managed by the key manager.

According to an embodiment, at 223, the key manager delegates management and any access to the tenant key store to a key daemon that processes within the TSM. This was discussed at length above with reference to the FIGS. 1A and 1B.

In an embodiment, at 224, the key manager restricts root processes from accessing the tenant key store. That is, only tenant storage processes (described at 230) can access the tenant key store; so, not even root processes initiated by the administrator can access the tenant key store.

Continuing with the embodiment of 224 and at 225, the key manager limits Application Programming Interface (API) calls that can be initiated outside the processing context of the TSM and ensures that all such calls have no access rights to the tenant key store.

At 230, the key manager ensures that just TSM storage processes are given access to the tenant key store. This was discussed at length above with reference to the FIGS. 1A and 1B.

In an embodiment, at 231, the tenant storage processes use the encryption keys to encrypt changed data written in the cloud storage environment before that changed data is stored in the cloud storage environment. So, no data is written to the cloud storage environment disks without being encrypted.

According to an embodiment, at 240, the key manager decrypts the data for the tenant using the tenant storage processes at startup for a storage session between the authenticated tenant and the TSM.

Continuing with the embodiment of 240 and at 241, the tenant storage processes use a master key housed with the data to decrypt the encryption keys from the tenant key store.

Still continuing with the embodiment of 241 and at 242, the key manager uses the master key to decrypt the data within the TSM for the storage session.

Figure 3:
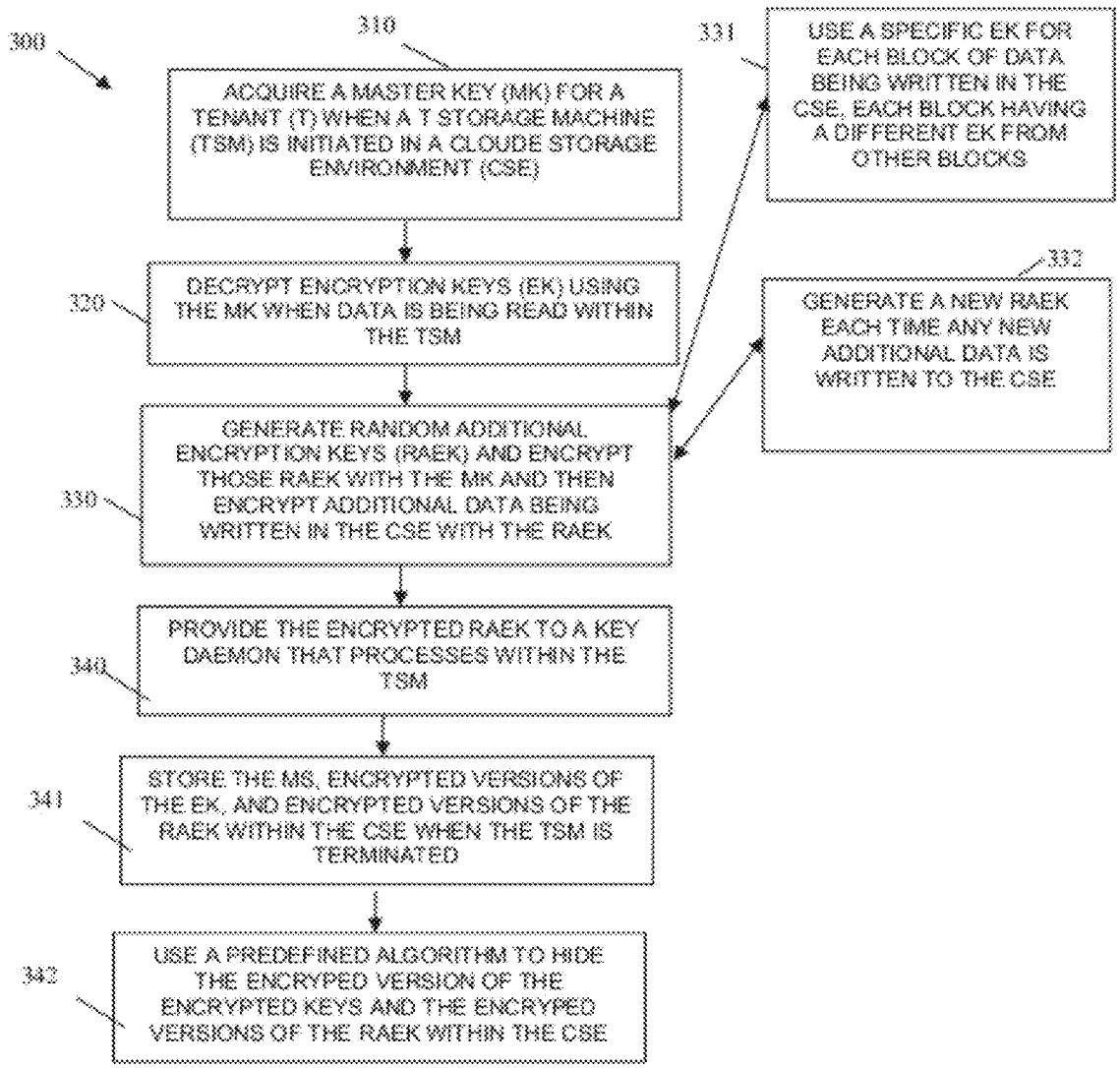
FIG. 3 is a diagram of another method for achieving tenant data confidentiality, according to embodiments presented herein.

FIG. 3 is a diagram of another method 300 for achieving tenant data confidentiality, according to embodiments presented herein. The method 400 (herein referred to as "key controller") is implemented, programmed, and resides within a non-transitory machine-readable storage medium that executes on one or more processors of a network. The network may be wired, wireless, or a combination of wired and wireless.

The key controller presents another and in some cases enhanced perspective of the key manager represented by the method 200 of the FIG. 2. Moreover, the key controller is implemented or deployed within the architecture of the FIG. 1A and utilizes the sequencing discussed with the FIG. 1B.

At 310, the key controller acquires a master key for a tenant when a TSM is initiated to the tenant in a cloud storage environment. Again, the cloud storage environment services multiple tenants, each tenant when connecting to the cloud storage environment having a TSM instantiated to service the storage of the tenant in a secure manner from the cloud storage environment.

At 320, the key controller decrypts encryption keys using the master key when data is being read within the TSM.

At 330, the key controller generates random additional encrypting keys and encrypts those random additional encryption keys with the master key and the encrypting additional data being written in the cloud storage environment with the random additional encryption keys.

According to an embodiment, at 331, the key controller uses a specific encryption key for each block of data being written in the cloud storage environment. Each block of data being written having a different encryption key from the other blocks. So, encryption is block based and not based on the entirety of the data.

In another case, at 332, the key controller generates a new random encryption key each time any new additional data is written to the cloud storage environment.

In an embodiment, at 340, the key controller provides the encrypted random additional keys to a key daemon processing within the TSM.

Continuing with the embodiment of 340 and at 341, the key controller stores the master key, encrypted versions of the encrypted keys, and encrypted versions of the random additional keys within the cloud storage environment when the TSM is terminated.

Still continuing with the embodiment of 341 and at 342, the key controller uses a predefined algorithm to hide the encrypted versions of the encrypted keys and the encrypted versions of the random additional keys within the cloud storage environment.

Figure 4:
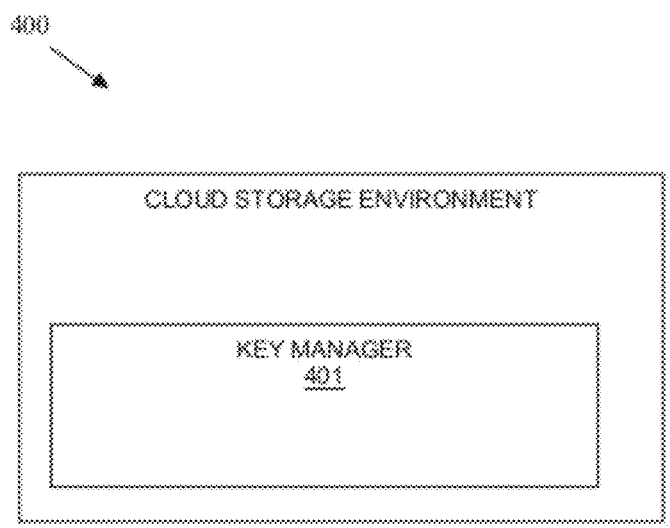
FIG. 4 is a diagram of a tenant data confidentiality system, according to embodiments presented herein.

FIG. 4 is a diagram of a tenant data confidentiality system 400, according to embodiments presented herein. The components of the tenant data confidentiality system 400 are implemented, programmed, and reside within a non-transitory machine-readable storage medium that executes on one or more processors of a network. The network may be wired, wireless, or a combination of wired and wireless.

In an embodiment, the tenant data confidentiality system 400 implements, inter alia, the processing associated with the methods 200 and 300 of the FIGS. 2 and 3, respectively using the architecture provided by the FIG. 1A and the sequencing provided by FIG. 1B.

The tenant data confidentiality system 400 includes a cloud storage environment having a key manager 401.

The tenant data confidentiality system 400 includes a cloud storage environment that has one or more processors, memory, and storage.

The memory of the cloud storage environment is configured with the key manager 501, which is implemented as executable instructions that process on one or more processors of the cloud storage environment. Example processing associated with the key manager 501 was presented above in detail with reference to the FIGS. 1A, 1B, 2, and 3.

The key manager 501 is configured to maintain a key storage for a particular tenant using a particular TSM within the cloud storage environment shared by multiple other tenants. The key storage includes a master key and a plurality of encrypted encryption keys, the key manager 501 only allows TSM storage processes to access the key storage.

According to an embodiment, the TSM is a VM and processing environment established dynamically for the particular tenant when a storage session with the cloud storage environment is initiated.

Continuing with the prior embodiment, and in some instances, the key storage is hidden and stored in the cloud storage environment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors of a machine configured to perform the method, comprising:
   establishing, on the machine, a tenant storage machine (TSM) in a cloud storage environment for an authenticated tenant, wherein establishing further includes creating the TSM as a Virtual Machine (VM) within the cloud storage environment for the authenticated tenant to access data of the authenticated tenant and the VM is just for access by the authenticated tenant;
   managing, from the machine, a tenant key store within the TSM for the authenticated tenant, the tenant key store including encryption keys for encrypting the data of the authenticated tenant within the cloud storage environment; and
   ensuring, from the machine, only TSM storage processes are given access to the tenant key store, wherein the TSM processes run within the TSM.

2. The method of claim 1, wherein managing further includes ensuring that the TSM includes just one key store, which is the tenant key store of the authenticated tenant.

3. The method of claim 1, wherein managing further includes creating the tenant key store as a container within the TSM for the authenticated tenant.

4. The method of claim 1, wherein managing further includes delegating management and any access to the tenant key store to a key daemon that processes within the TSM.

5. The method of claim 1, wherein managing further includes restricting root processes from accessing to the tenant key store.

6. The method of claim 5, wherein restricting further includes limiting Application Programming Interface (API) calls that can be initiated outside the TSM and ensuring all such calls have no access to the tenant key store.

7. The method of claim 1, wherein ensuring further includes using the encryption keys by the TSM storage processes to encrypt changed data written in the cloud storage environment before that changed data is stored in the cloud storage environment.

8. The method of claim 1 further comprising, decrypting the data for the authenticated tenant by the TSM storage processes at startup for a storage session between the tenant and the TSM.

9. The method of claim 8, wherein decrypting further includes using, by the TSM storage processes, a master key housed with the data to decrypt the encryption keys from the tenant key store.

10. The method of claim 9, wherein using further includes using the master key to decrypt the data within the TSM for the storage session.

11. A method implemented in a non-transitory machine-readable storage medium and processed by one or more processors of a machine configured to perform the method, comprising:
    acquiring, on the machine, a master key for a tenant when a tenant storage machine (TSM) is initiated to the tenant in a cloud storage environment, wherein the tenant does not have to know the master key, and creating the TSM as a Virtual Machine (VM) within the cloud storage environment for the tenant to access data of the tenant and the VM is just for access by the tenant;
    decrypting, on the machine, encryption keys using the master key when the data is being read within the TSM; and
    generating, on the machine random additional encryption keys and encrypting those random additional encryption keys with the master key and then encrypting additional data being written in the cloud storage environment with the random additional encryption keys, wherein only TSM processes running within the TSM can access a decrypted version of the data and the additional data and only the tenant has access to the TSM.

12. The method of claim 11 further comprising, providing the encrypted random additional encryption keys to a key daemon processing within the TSM.

13. The method of claim 12 further comprising storing the master key, encrypted versions of the encryption keys, and encrypted versions of the random additional encryption keys within the cloud storage environment when the TSM is terminated.

14. The method of claim 13 further comprising, using a predefined algorithm to hide the encrypted versions of the encrypted keys and the encrypted versions of the random additional encrypted keys within the cloud storage environment.

15. The method of claim 11, wherein generating further includes using a specific encryption key for each block of data being written in the cloud storage environment, wherein each block having a different encryption key from other blocks.

16. The method of claim 11, wherein generating further includes generating a new random encryption key each time any new additional data is written to the cloud storage environment.

17. A system, comprising:
    a cloud storage environment having one or more processors, memory, and storage, the cloud storage environment situated in a cloud environment and accessed over a network; and
    the memory configured with a key manager implemented as executable instructions that process on the one or more processors of the cloud storage environment;
    wherein the key manager is configured to maintain a key storage for a particular tenant using a particular tenant storage machine (TSM) within the cloud storage environment shared by multiple other tenants, each tenant having that tenant's own TSM within the cloud storage environment, and each TSM created as a Virtual Machine, the key storage including a master key and a plurality of encrypted encryption keys, the key manger only allows TSM storage processes to access the key storage and the TSM storage processes run within the particular TSM.

19. The system of claim 17, wherein the particular TSM is established dynamically for the particular tenant when a storage session with the cloud storage environment is initiated.

19. The system of claim 18, wherein the key storage is hidden and stored in the cloud storage environment.

* * * * *

UNITED STATES PATENT AND TRADEMARK OFFICE
CERTIFICATE OF CORRECTION

PATENT NO.         : 9,270,459 B2
APPLICATION NO.    : 13/611170
DATED              : February 23, 2016
INVENTOR(S)        : Mukkara et al.

It is certified that error appears in the above-identified patent and that said Letters Patent is hereby corrected as shown below:

On the Title Page

In item (75), in "Inventors", in Column 1, Line 1, after "Bangalore", insert --, Karnataka--, therefor In item (75), in "Inventors", in Column 1, Line 2, after "Bangalore", insert --, Karnataka--, therefor In item (75), in "Inventors", in Column 1, Line 3, after "Bangalore", insert --, Karnataka--, therefor In item (73), in "Assignee", in Column 1, Line 1, delete "Cupertino," and insert --San Mateo,--, therefor Signed and Sealed this
Thirteenth Day of February, 2018

Andrei Iancu
*Director of the United States Patent and Trademark Office*